Dec. 29, 1970    F. B. MERCER ET AL    3,551,543
MANUFACTURE OF PLASTIC NET
Filed Sept. 6, 1967

INVENTORS
FRANK BRIAN MERCER
KEITH FRASER MARTIN

BY

ATTORNEY

United States Patent Office 3,551,543
Patented Dec. 29, 1970

3,551,543
MANUFACTURE OF PLASTIC NET
Frank Brian Mercer and Keith Fraser Martin, Blackburn, England, assignors to Plastic Textile Accessories Limited, Mill Hill, Blackburn, Lancashire, England, a British company
Filed Sept. 6, 1967, Ser. No. 665,820
Int. Cl. D01d 5/20
U.S. Cl. 264—167                                1 Claim

ABSTRACT OF THE DISCLOSURE

Plastics material is extruded through a moving pair of dies which form the material into a net or trellis (FIG. 1) comprising spaced transverse strands interconnected by short spaced strands extending in the direction of extrusion and so arranged that the short strands interconnecting one adjacent pair of transverse strands are nonaligned with the short strands interconnecting the previous and subsequent transverse strands such that haul-off tension applied to the extruding net opens out the meshes into a generally diamond shape in which the transverse strands take up a zig-zag configuration.

---

This invention relates to an extruded plastics net, trellis, lattice or like reticulated structure (hereinafter for convenience referred to as a "net") of the type in which certain of the strands extend in the machine direction and the other strands extend in a general direction transversely at right angles thereto. The invention further relates to methods and apparatus for the manufacture of net of the type defined above.

It has been previously proposed to extrude a plastics net in sheet or tubular form in which the machine direction strands are substantially parallel to the machine direction and continuous, i.e., considering a single machine direction strand, the intercepts thereof lying between the successive transverse strands are in alignment. Such nets when subjected to tensions along either the machine direction or the transverse strands are dimensionally stable. It has also been proposed previously to extrude net, both square mesh and diamond in which the diagonals of each mesh are disposed, respectively, in the machine direction and transversely thereto; such nets are extensible (i.e., lack dimensional stability) when tensions are applied in the machine direction or transverse thereto.

It is an object of the present invention to provide a plastics net of the type indicated which is extensible in both the machine direction and transverse thereto.

The invention consists in an extruded plastics net of the type indicated wherein the transverse strands are interconnected by machine direction strands which are offset or non-aligned between adjacent pairs of transverse strands.

The invention further consists in an extruded plastics net of the type indicated wherein the machine direction strands are not continuous and comprise a first set of strands linking every second pair of transverse strands and a second set of strands linking the intervening pairs of transverse strands and disposed in non-alignment with, and in the spacings between, the strands of the first set.

The invention still further consists in an extruded plastics net of the type indicated which has been subjected to stretching in the machine direction and setting so that the mesh structure is diamond shaped.

The invention still further consists in a method of extruding a plastics net of the type indicated comprising cyclically and sequentially converting a transversely continuous flow of plastics under pressure into a first plurality of transversely spaced machine direction flows by obtruding the transversely continuous flow at a plurality of transversely spaced points, restoring the transversely continuous flow by removing the obtrusions, re-converting the latter flow into a second plurality of transversely spaced machine direction flows offset from the first plurality of flows by similar but offset obtrusions, restoring the transversely continuous flow by removing the obtrusions and continuing to repeat the cycle, the transversely continuous flows forming the transverse strands and the spaced machine direction flows the machine direction strands.

The invention still further consists in a method of extruding an integral plastics reticulated product in the form of a network, trellis or lattice comprising forcing plastics under pressure through a moulding zone the moulding characteristics are cyclically altering to provide sequential stages (a) the extrusion of a first series of transversely spaced strands parallel to the direction of extrusion (b) the extrusion of a continuous transverse strand extending in a general direction at right angles to the first series of strands (c) the extrusion of a second series of transversely spaced strands parallel to the direction of extrusion but extending in alignment in the intervals between the strands of the first series and back through stages (b) to (a) when the cycle repeats, each first set of strands being moulded integrally with each transverse strand and each transverse strand being moulded integrally with each second set of strands stages (a), (b) and (c) being spaced in the direction of extrusion.

The invention still further consists in apparatus for extruding a plastics net of the type indicated comprising die means defining a slot capable of extruding a continuous sheet of plastics and secondary die means operable to close down the slot die means into a plurality of strand-forming die orifices including a first set of members defining between them and the slot die means a plurality of first strand-forming die orifices and a second set of members defining between them and the slot die means a plurality of second strand-forming die orifices and means for relatively moving the slot die means and the secondary die means from a position in which the first strand forming die orifices are defined to a position in which the second strand forming die orifices are defined through a position in which the die slot means is open along its extent, wherein the first set of die orifices on the secondary die means are aligned in the spaces between the second set of die orifices on the secondary die means.

The invention still further consists in apparatus according to the preceding paragraph wherein the relative movement between the slot die means and the secondary die means is transverse to the direction of extrusion.

The invention still further consists in apparatus according to the preceding paragraph but one, wherein the relative movement between the slot die means and the secondary die means is parallel to the direction of extrusion.

While the term "strands" has been used in the phrase "machine direction strands" it must be understood that these "strands" may be very short and appear in the product as mere joints or connections between adjacent transverse strands.

By the term "plastics" or "plastics material," as used herein, is meant:

(a) A synthetic organic thermoplastic polymer material capable of melt or compression extrusion in a molten state through dies and settable by a cooling medium on issuance from the dies. Suitable thermoplastic materials include polyamides or superpolyamides, such as nylon; polyesters; polyvinylchloride and copolymers thereof with vinylacetate or vinylidene chloride; and polyolefins and the like; or (b) Natural organic macromolecular materials such as cellulose chemically modified e.g. by esterification to render them thermoplastic, such as cellulose acetate;

(c) Natural or synthetic rubbers, subsequently vulcanised or containing vulcanising agents; or (d) Those thermosetting plastics materials or mixtures thereof with thermoplastic materials, which are capable of extrusion; or (e) Expandable or foamable thermoplastic materials such as expandable polystyrene or expandable polyethylene, subject to the above materials being safe and suitable for use in the methods, or for the product, described herein.

Figure 1:
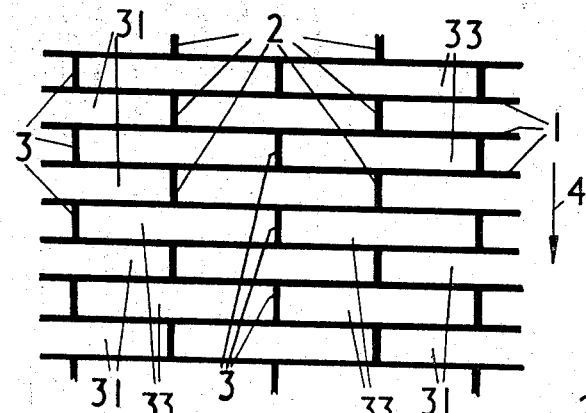
FIG. 1 is a diagram of the basic net construction (i.e. at the point of extrusion) according to the present invention.

In carrying the invention into effect, the basic structure of the net as extruded (i.e. at the instant of extrusion) is shown in FIG. 1 in which transverse strands 1 are interconnected by a first set of machine direction strands 2 and a second set of machine direction strands 3 disposed in alignment in the interval between the first set of strands 2. The "machine direction" is indicated by the arrow 4. Thus a net of the construction of FIG. 1 is dimensionally stable only in the transverse direction 5, i.e. to a tension applied parallel to the transverse strands 1, but has extensibility (i.e. is not dimensionally stable) when a tension is applied in the machine direction 4 so that on haul-off it will immediately assume the configuration shown in FIG. 2, wherein the same reference numbers apply to the same strands as in FIG. 1, the transverse strands 1 having assumed a zig-zag form.

Figure 2:
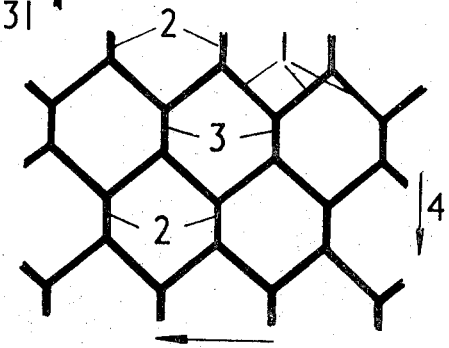
FIG. 2 is a diagram showing the net construction of FIG. 1 after extrusion when subjected to stretching in a direction parallel to the short strand (i.e. in the machine direction)

The haul-off tension may be adjusted so that the pull on the net re-configures the meshes into the diamond shapes other than those shown in FIG. 2 whereafter the net is set by the conventional water bath or other cooling used in plastics net extrusion techniques.

Nets re-configured into the diamond mesh form will have extensibility both in the machine direction 4 and in transverse direction 5 and will, in fact, behave as a conventional diamond mesh net which indeed it has become.

Figure 3:
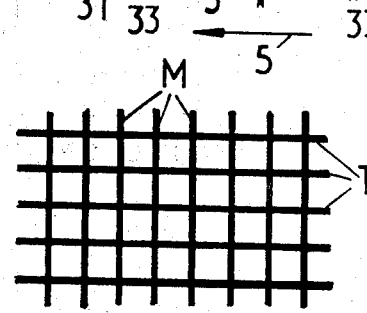
FIG. 3 is a diagram of a net of square mesh form as heretofore proposed and produced (i.e. with aligned and continuous machine direction strands).

The above re-configuration of the net is not possible with plastics nets as proposed heretofore whenever the machine direction strands are continuous, (see FIG. 3 wherein the machine direction strands are indicated by M and the transverse strands by T).

Nets according to the present invention may be molecularly oriented by stretching in known manner, such orientation normally being confined to the net strands leaving the "joints" unoriented, but the orientation may be extended through the "joints."

It must be understood from the first, as will be described in greater detail hereinafter, that the basic net structure of FIG. 1 is an evanescent or transient stage only which due to its ready extensibility in the machine direction 4 will immediately on extrusion be converted by haul-off tension applied to the product in known manner into the diamond form of net shown in FIG. 2. It will also be understood that the particular mesh proportions shown in FIG. 1 and also their pure geometric shapes are exemplary and diagrammatic only.

Next, according to the present invention, may be produced in a variety of ways which will now be described.

In 1905 a French inventor, Duinat, proposed a method, in recent years taken up by others, of extruding a mesh-work or net which in effect comprised cyclically interrupting the extrusion of a sheet of plastics material, the interruptions forming the mesh apertures or holes in the net. The apparatus consisted of a die, through which a settable plastics material could be forced under pressure, in which one part of the die was in the form of a straight narrow slot which as such would extrude a sheet or plate; co-operating with the straight slot die, however, was a second die part in the form of a comb slot with square or zig-zag teeth, so that relative movement of the die parts caused the comb slot to pass and re-pass across the width of the straight slot die producing either square mesh net (as in FIG. 3) for the square tooth comb die or direct diamond mesh net for the zig-zag tooth comb die. (The present invention is not concerned with the diamond form of a net produced by the zig-zag tooth comb die.) The square tooth comb die and those subsequently developed from Duinat's original idea were either a single-sided comb with equal width square teeth (the width of each tooth corresponding to the transverse dimension of each mesh aperture) or a double sided comb in which two identical square toothed combs registered with, and faced, each other on either side of a transverse slot, the gaps separating the teeth being exactly opposite one another. By either of these constructions a square mesh net with continuous machine direction strands (M) as shown in FIG. 3 could only be produced.

Figure 4:
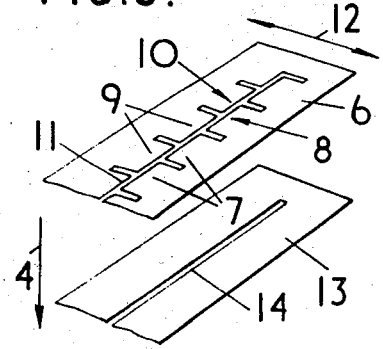
FIG. 4 is a diagram of one form of die means for extruding the net construction of the present invention.

By modifying the square tooth comb die 6, as shown in FIG. 4 of the drawings so that the teeth 7 of one comb 8 are offset from the teeth 9 of the other comb 10 on either side of the common slot 11 and causing a relative reciprocating movement (as shown by the arrow 12) between the comb die and the straight slot-die 13 when the two dies are in close face-to-face contact (they are shown "exploded" in FIG. 4), a square mesh net of the character shown in FIG. 1 is extruded. Thus, when the teeth 7 of the comb 8 extend across the slot 14 of the straight slot-die 13, the machine direction strands 2 (of FIG. 1) are formed; when movement of the dies bring the common slot 11 of the comb die into register with the slot 14 in the straight slot die 13, transverse strands 1 (of FIG. 1) are formed, and when the teeth 9 of the comb 10 extend across the slot 14 of the straight slot die 13, the machine direction strands 3 (of FIG. 1) are formed and so on.

This form of apparatus as shown in FIG. 4 is a rectilinear type which only produces net in sheet form of finite width.

Figure 5:
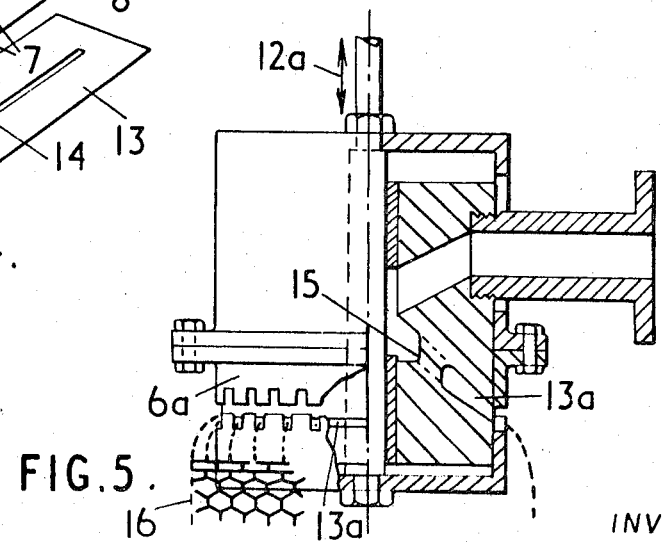
FIG. 5 is a diagram (in section on the right of the vertical centre line) of a modified form of the die means shown in FIG. 4 for producing a tubular net of the construction according to the present invention.

For the production of a tubular product, the die means described with reference to FIG. 4 is modified by forming both the straight slot die 12 and comb die 6 as continuous annular forms as shown in FIG. 5 which shows a schematic machine only. Thus the comb die 6a (the counterpart of the comb die 6 of FIG. 4) is reciprocated up and down (see arrow 12a) against the straight slot die 13a (the counterpart of the straight slot die 13 of FIG. 4), so that plastics fed under pressure via the duct 15 is extruded as a tubular product 16 having the form as shown in FIG. 1 and assuming immediately under haul-off tension the form shown in FIG. 2.

In an alternative form of apparatus for the extrusion of net, according to the present invention, which can be used in either rectilinear or annular form to produce, respectively, sheet or tubular net (although the annular form to produce tubular net is preferred), the relative movement of the die means is substantially parallel to the direction of extrusion as compared with the previously described apparatus on which the relative movement of the die means is transverse to the direction of extrusion. Nevertheless the basic concept of cyclically interrupting the extrusion of a sheet (tube) of plastics material, referred to above, still applies.

In the method of extruding net according to the present invention, the dimensions of the meshes may be varied by suitable choice of the spacing between the machine direction strand-forming parts (i.e. the comb teeth of the apparatus of FIGS. 4 and 5) and the extrusion pressure, viscosity of the plastics material and rate of relative movement of the dies further influence the shape of the meshes and the gauge of the transverse strands.

We claim:

1. A method of extruding a net of organic thermoplastic polymer selected from the group consisting of superpolyamides cellulose esters, polyvinylacetate, polyvinylidinechloride, polyolefins, natural and synthetic rubbers, expandable polystyrene and expandable polyethylene comprising cyclically and sequentially converting a transversely continuous flow of a melt of said organic thermoplastic polymer material under pressure into a first plurality of transversely spaced machine direction flows at right angles to said transversely continuous flow by obtruding the transversely continuous flow at a plurality of transversely spaced points, restoring the transversely continuous flow by removing the obtrusions, reconverting the latter flow into a second plurality of transversely spaced machine direction flows offset from the first plurality of flows by similar but offset obtrusions, restoring the transversely continuous flow by removing the obtrusions and continuing to repeat the cycle, the transversely continuous flows forming the transverse strands and the spaced machine direction flows the machine direction strands.

References Cited

UNITED STATES PATENTS

| | | | |
|---|---|---|---|
| 2,919,467 | 1/1960 | Mercer | 264—Net |
| 3,172,154 | 3/1965 | Martin et al. | 264—Net |
| 3,019,483 | 2/1962 | Schultheiss | 264—167 |
| 3,251,181 | 5/1966 | Hureau | 264—Net |
| 3,384,692 | 5/1968 | Galt et al. | 264—167 |
| 3,394,431 | 7/1968 | Nalle | 264—167X |
| 3,444,588 | 5/1969 | Martin et al. | 264—167X |

FOREIGN PATENTS

| | | | |
|---|---|---|---|
| 368,393 | 7/1906 | France | 264—Net |
| 1,109,131 | 6/1961 | Germany | 6—6 |

JULIUS FROME, Primary Examiner

J. H. WOO, Assistant Examiner

U.S. Cl. X.R.

264—41, 177